US008649034B2

(12) United States Patent
Tsuzuki

(10) Patent No.: US 8,649,034 B2
(45) Date of Patent: Feb. 11, 2014

(54) IMAGE FORMING APPARATUS HAVING A CONTROLLER AND MEMORY UNIT

(75) Inventor: Toru Tsuzuki, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1532 days.

(21) Appl. No.: 11/896,161

(22) Filed: Aug. 30, 2007

(65) Prior Publication Data

US 2008/0055660 A1    Mar. 6, 2008

(30) Foreign Application Priority Data

Aug. 31, 2006  (JP) ................................ 2006-235713

(51) Int. Cl.
*G06K 15/00*     (2006.01)
*G06F 3/12*      (2006.01)
*G06F 15/00*     (2006.01)
*G06K 1/00*      (2006.01)

(52) U.S. Cl.
USPC ........................... 358/1.14; 358/1.15; 358/1.9

(58) Field of Classification Search
None
See application file for complete search history.

(56) References Cited

U.S. PATENT DOCUMENTS

| | | | | |
|---|---|---|---|---|
| 5,349,448 A | * | 9/1994 | Hirai | .............................. 358/444 |
| 6,665,088 B1 | * | 12/2003 | Chiba et al. | .................. 358/1.17 |
| 6,932,523 B1 | * | 8/2005 | Yamada et al. | .................. 400/78 |
| 2004/0156068 A1 | * | 8/2004 | Yoshida et al. | .............. 358/1.13 |
| 2005/0111034 A1 | * | 5/2005 | Karasaki et al. | ............. 358/1.15 |
| 2005/0264846 A1 | * | 12/2005 | Tsuzuki | ........................ 358/1.18 |
| 2005/0275902 A1 | | 12/2005 | Koyama et al. | |
| 2006/0268310 A1 | * | 11/2006 | Tamai et al. | .................. 358/1.14 |
| 2007/0170250 A1 | * | 7/2007 | Bystrom et al. | .............. 235/382 |

FOREIGN PATENT DOCUMENTS

| | | |
|---|---|---|
| EP | 1 087 607 A2 | 3/2001 |
| EP | 1 087 607 A3 | 3/2001 |
| JP | 2003-333226 | 11/2003 |

OTHER PUBLICATIONS

European Search Report issued in European Patent Application No. EP 07 25 3416, mailed Jan. 7, 2008.
European Office Action issued in European Patent Application No. EP 07 253 416.7-1522, dated Oct. 10, 2008.

* cited by examiner

*Primary Examiner* — Ming Hon
(74) *Attorney, Agent, or Firm* — Baker Botts L.L.P.

(57) ABSTRACT

An image forming apparatus includes a mounting portion on which an external memory device is mountable, a detecting unit that detects mounting or non-mounting of the external memory device to the mounting portion, a printing unit that prints data acquired from the external memory device, a memory unit that stores the data, and a controller. The controller is operable to control the printing unit to reprint the data stored on the memory unit, and prohibit the data from being reprinted when a detection result by the detecting unit indicates non-mounting of the external memory device.

13 Claims, 6 Drawing Sheets

IMAGE FORMING APPARATUS HAVING A CONTROLLER AND MEMORY UNIT

CROSS-REFERENCE TO RELATED APPLICATION

This application claims priority from Japanese Patent Application No. 2006-235713, filed on Aug. 31, 2006, the entire subject matter of which is incorporated herein by reference.

TECHNICAL FIELD

Aspects of the present invention relate to an image forming apparatus capable of mounting an external memory device thereto.

BACKGROUND

There has been proposed an image forming apparatus that is capable of executing a direct print. The image forming apparatus has a mounting portion, an operation unit and an image forming unit. The mounting portion mounts an external memory that stores data. The operation unit is used to input a command for starting of printing of an image based on the data, a selection of the data as a printing object, etc. from a user. The image forming unit acquires the data from the external memory mounted to the mounting portion based on an operation of the operation unit, and converts the acquired data into printing data that is printable by the image forming unit in order to print the image.

Further, in the image forming apparatus of this kind, the printing data generated at a starting time of printing may be stored on a memory device such as a hard disk drive (HDD), etc. When a repeat button is operated, the printing data stored on the HDD is reprinted based on information at a generating time of the printing data. When such reprinting is performed, it is not necessary to acquire the data from the external memory again and convert the acquired data into the printing data. Therefore, reprinting can be efficiently executed.

However, the printing data is still left in the HDD after printing. Thus, such reprinting is not preferable in terms of security of the printing data.

Therefore, in order to maintain security, JP-A-2003-333226 discloses a configuration in which erasing the stored printing data on the HDD is performed when a predetermined data holding time has passed after the printing data is stored on the HDD.

However, in the related image forming apparatus disclosed in JP-A-2003-333226, as the data holding time is lengthened, the possibility that the printing data stored on the HDD can be utilized in reprinting is increased. Accordingly, it is possible to improve usability at an executing time of the reprinting. However, the possibility that the printing data is reprinted by another user is also increased. Therefore, it is difficult to maintain the security of the printing data.

Further, in the related image forming apparatus, as the data holding time is shortened, the possibility that the printing data stored on the HDD can be utilized in reprinting is reduced. Therefore, although the security of the printing data may be maintained, it is difficult to maintain the usability when a user executes the reprinting.

That is, in the related image forming apparatus for erasing the printing data stored on the HDD after the passage of the data holding time, it is difficult to balance usability at the executing time of the reprinting and the security of the printing data.

SUMMARY

Aspects of the present invention provide an image forming apparatus to balance security of printing data and usability at a reprinting time of the printing data by utilizing an external memory.

DETAILED DESCRIPTION

<General Overview>

According to an aspect of the present invention, there is provided an image forming apparatus including: a mounting portion on which an external memory device is mountable; a detecting unit that detects mounting or non-mounting of the external memory device to the mounting portion; a printing unit that prints data acquired from the external memory device; a memory unit that stores the data; and a controller that is operable to control the printing unit to reprint the data stored on the memory unit, and prohibit the data from being reprinted when a detection result by the detecting unit indicates non-mounting of the external memory device.

That is, the printing unit prints the data acquired from the external memory device mounted to the mounting portion or the exterior, and the data is stored on the memory unit. If the external memory device is mounted to the mounting portion, the reprinting unit receiving a command from a user prints the data stored on the memory unit. In contrast, if no external memory device is mounted to the mounting portion, the reprinting disabling unit disables the reprinting of the data stored on the memory unit.

According to the above aspect, while the external memory device is mounted, the data stored on the memory unit can be reprinted. Therefore, a user (hereinafter, this user is set to a printing user) printing the data by the printing unit can maintain usability at a reprinting time of the same data at the same level as the related image forming apparatus. Further, while the external memory device is mounted, the possibility that the printing user exists near the image forming apparatus is high. Since a possibility of reprinting by a third person is low, security can be ensured.

Further, if no external memory device is mounted (i.e., it is non-mounting), the printing user terminates utilization of the image forming apparatus, and the possibility that the printing user separates from the apparatus is set to be high. The reprinting of the data stored on the memory unit is disabled. Therefore, it is possible to prevent the data from being printed by another user (i.e., except for the printing user).

According thereto, the security of the data can be maintained while the usability is maintained when the user reprints the same data.

<Illustrative Aspects>

Illustrative aspects of the present invention will be described with reference to the accompanying drawings.

(Exemplary Structure of Image Forming Apparatus)

Figure 1:
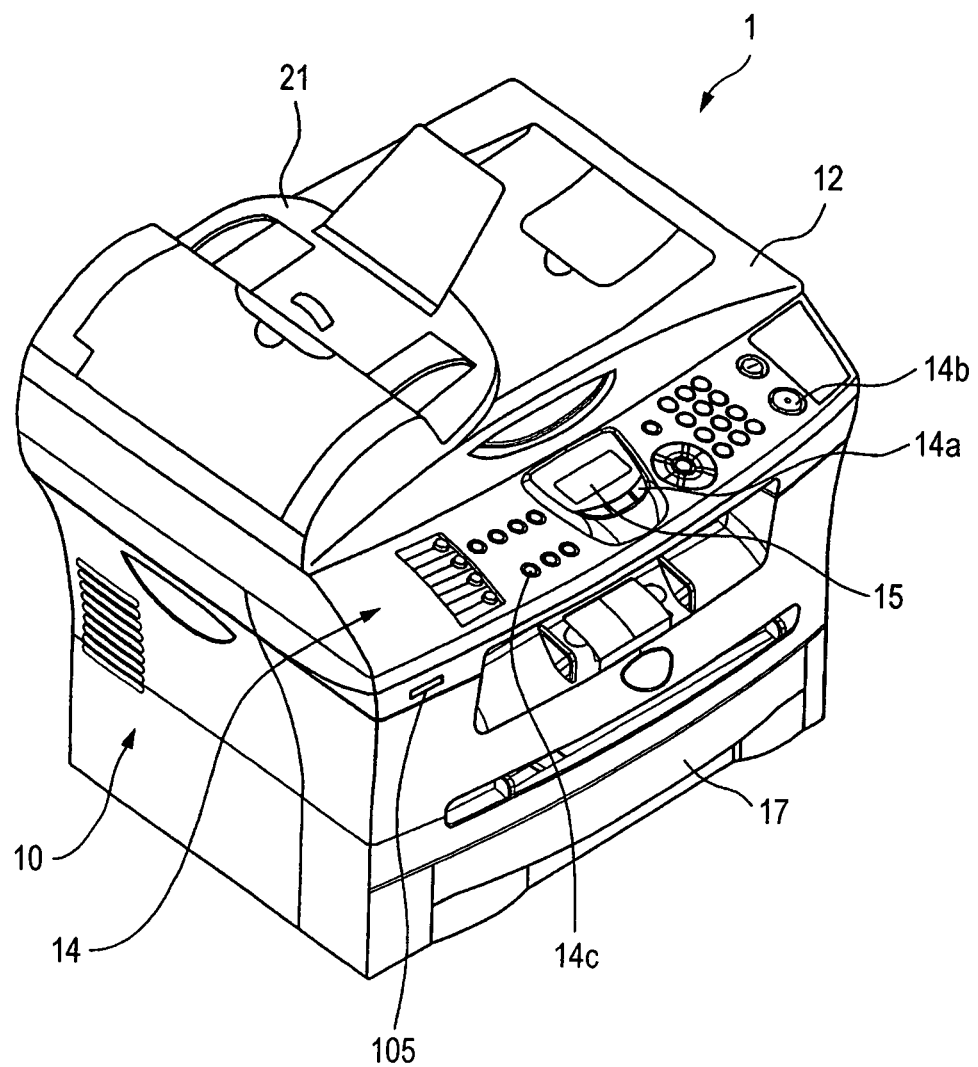
FIG. 1 is an exemplary perspective view of an image forming apparatus according to an aspect of the present invention.

FIG. 1 is an exemplary perspective view of an image forming apparatus according to an aspect of the present invention.

The image forming apparatus 1 is a multi-function device (MFD) having functions of at least an image scanner, a printer, a copying machine, and a facsimile.

The image forming apparatus 1 has a sheet tray 17, a main body 10, a main body cover 12, a connecting portion 105 (one example of a mounting portion) and an operation unit 14. The sheet tray 17 feeds a sheet 18 (see FIG. 2). The main body 10 prints an image based on data obtained by reading information of a document, etc. on the supplied sheet 18 from the sheet tray 17. The main body cover 12 is supported in the main body 10 so as to be opened and closed in order to cover an upper face of the main body. An external memory 106 (see FIG. 3) able to read and write the data is attached and detached in the connecting portion 105. Required information is inputted to the operation unit 14 at a time of using the image forming apparatus 1.

The main body cover 12 has an automatic document feeder (ADF) (not shown) that automatically conveys a document placed on a placing base 21.

Further, the operation unit 14 has a selecting key 14a for selecting a function desired by a user from among plural functions, a start key 14b for executing the function selected by the user, a reprint key 14c for executing reprinting of printing data described later, and a display unit 15 for displaying a state of the image forming apparatus 1, etc.

The display unit 15 is a liquid crystal panel such as a touch panel. The display unit 15 inputs information such as setting information required in printing, etc. by performing a pushing-down operation.

(Image Forming Unit)

An exemplary internal structure of the main body 10 will be explained.

Figure 2:
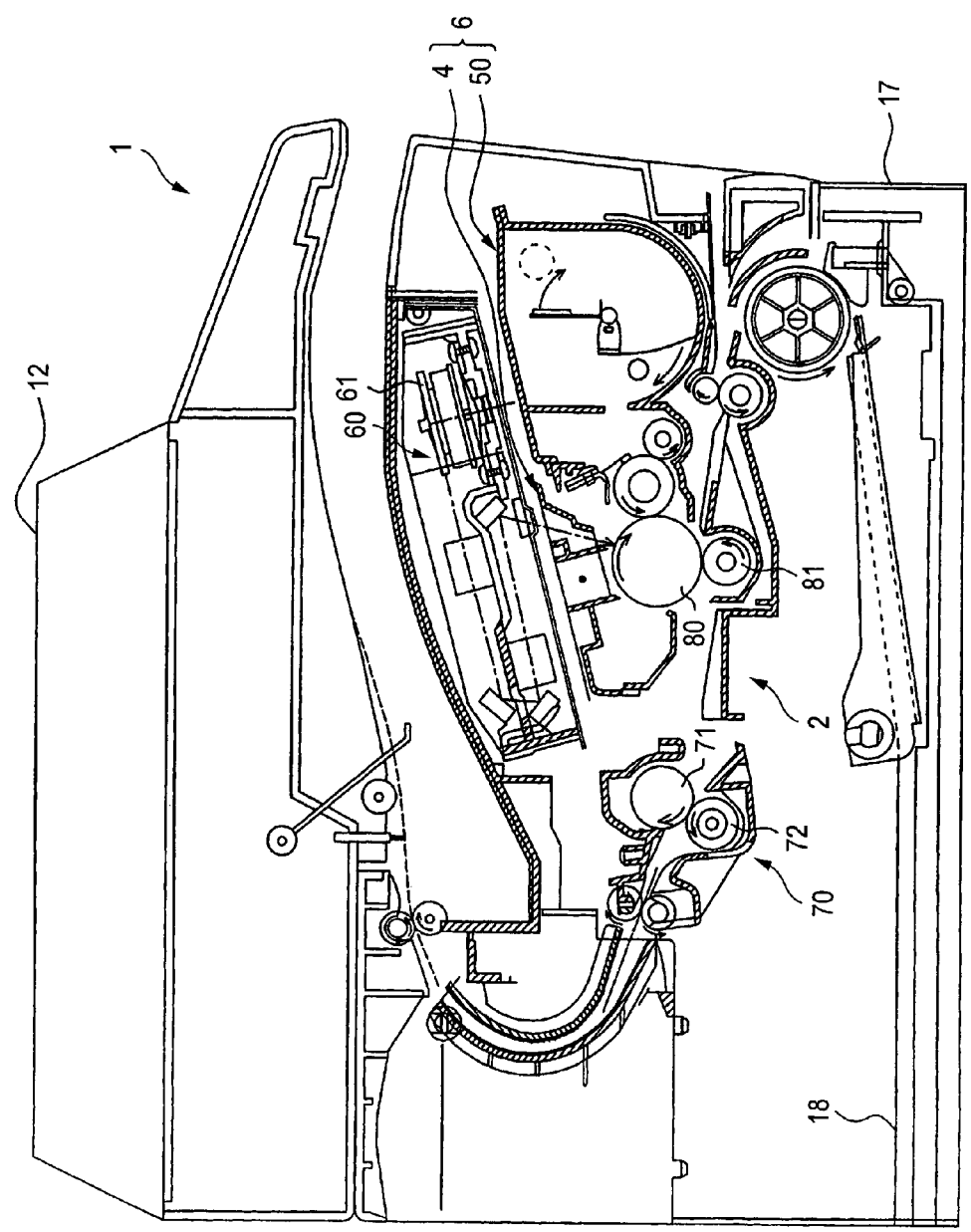
FIG. 2 is an exemplary cross-sectional view showing a main body of the image forming apparatus.

FIG. 2 is an exemplary cross-sectional view of the image forming apparatus 1.

The main body 10 has a document reading unit 40 (see FIG. 3) for reading the document, and an image forming unit 2 for forming an image based on the data and printing the image on the sheet 18. The document reading unit 40 and the image forming unit 2 are provided to a main body case.

The image forming unit 2 has a scanner unit 60 for irradiating a laser beam and forming an image, a process cartridge 6 for transferring the image formed in the scanner unit 60 to the sheet 18, and a fixing unit 70 for fixing the transferred image to the sheet 18.

The scanner unit 60 deflects the laser beam emitted from a laser diode by a polygon mirror 61, converges the laser beam by an optical device, and changes an optical path. Thereafter, the scanner unit 60 irradiates the laser beam to the surface of a photosensitive drum 80 described later by high speed scanning.

The process cartridge 6 has a structure for performing an image forming process (charging, development and transfer). The process cartridge 6 has a drum cartridge 4 for transferring an image to the sheet 18, and a developing cartridge 50 that is mounted to the drum cartridge 4 so as to be freely attached and detached and stores a toner (not shown).

The drum cartridge 4 has a photosensitive drum 80 onto which the laser beam is irradiated and which forms a toner image, and a transfer roller 81 rotated in association with the photosensitive drum 80. The toner image formed on the photosensitive drum 80 is transferred to the sheet 18 that passes between the photosensitive drum 80 and the transfer roller 81.

The fixing unit 70 has a heating roller 71 and a pressing roller 72. When the toner image transferred to the sheet 18 by the drum cartridge 4 is conveyed between the heating roller 71 and the pressing roller 72, the toner image is heated and pressed in order to fix the toner to the sheet 18.

That is, in the image forming unit 2, when the sheet 18 supplied from the sheet tray 17 passes the process cartridge 6, the toner image formed by the laser beam irradiated from the scanner unit 60 is transferred to the sheet 18. When the toner image passes the fixing unit 70, the toner image is fixed to the sheet 18.

(Electric Structure of Image Forming Apparatus)

The electric structure of the image forming apparatus 1 will be explained.

Figure 3:
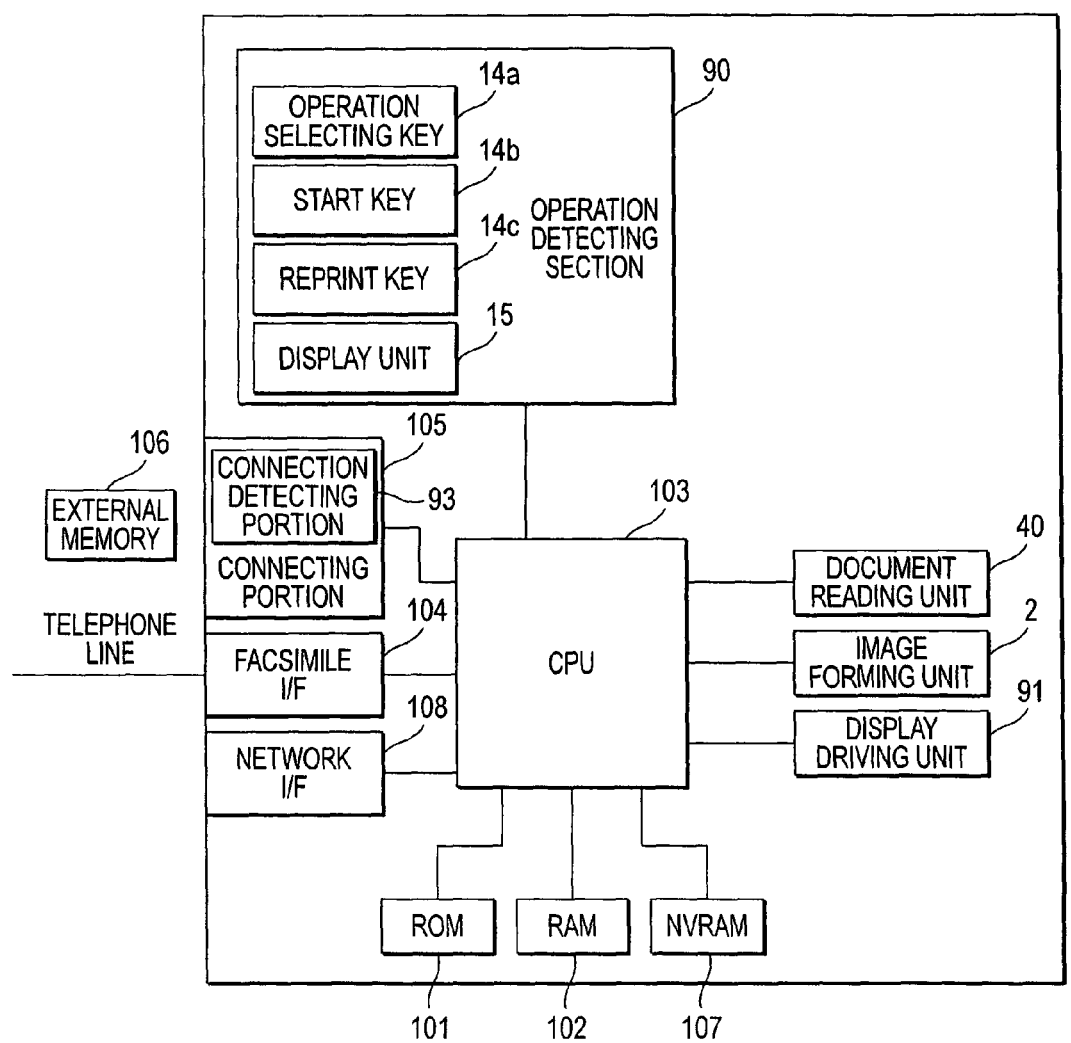
FIG. 3 is an exemplary block diagram showing an electric structure of the image forming apparatus.

FIG. 3 is an exemplary block diagram showing the electric structure of the image forming apparatus 1.

The image forming apparatus 1 has a network interface (network I/F) 108 for connection to an external device (not shown) such as a personal computer, etc., a facsimile interface (facsimile I/F) 104 for connection to a telephone line, and a connecting portion 105. The image forming apparatus 1 has a ROM 101 for storing a processing program for controlling various operations of the image forming apparatus 1, a RAM 102 for temporarily storing a processing result, etc., and an NVRAM (nonvolatile memory) 107 for storing data required to be stored even when an electric power source is turned off. The image forming apparatus 1 has a CPU 103 for executing a processing program stored on the ROM 101.

The document reading unit 40, the image forming unit 2, a display driving unit 91 for displaying an image in the display unit 15, and an operation detecting section 90 for detecting the operation of the operation unit 14 are connected to CPU 103.

The connecting portion 105 is configured such that an electric current is conducted to the external memory 106 when the external memory 106 is mounted. The connecting portion 105 has a connection detecting portion (one example of a detecting unit of the present invention) 93 for detecting that the external memory 106 is mounted or non-mounted. As the data stored on the external memory 106, there are a structure having a general purpose image format of JPEG, TIFF, etc., a structure made by general word processor software, document data of a PDF format, etc., a structure formed by filing printing data outputted by a print driver, etc.

That is, in accordance with information inputted through the operation unit 14, the image forming apparatus 1 performs conversion into data generated by reading information from a document by the document reading unit 40, and printing data (the former is a so-called copy and the latter is a so-called direct print) able to form an image by the image forming unit 2 from the data, etc. acquired from the external memory 106. The converted data is stored on the RAM 102. In the image forming apparatus 1, the image forming unit 2 is operated in accordance with the information inputted through the operation unit 14, and the image based on the printing data stored on the RAM 102 is printed on the sheet 18.

(Printing Selection Processing)

Printing selection processing executed by CPU 101 (one example of controller) of the image forming apparatus 1 and executing printing in accordance with the information inputted through the operation unit 14 will be explained.

FIRST EXAMPLE

Figure 4:
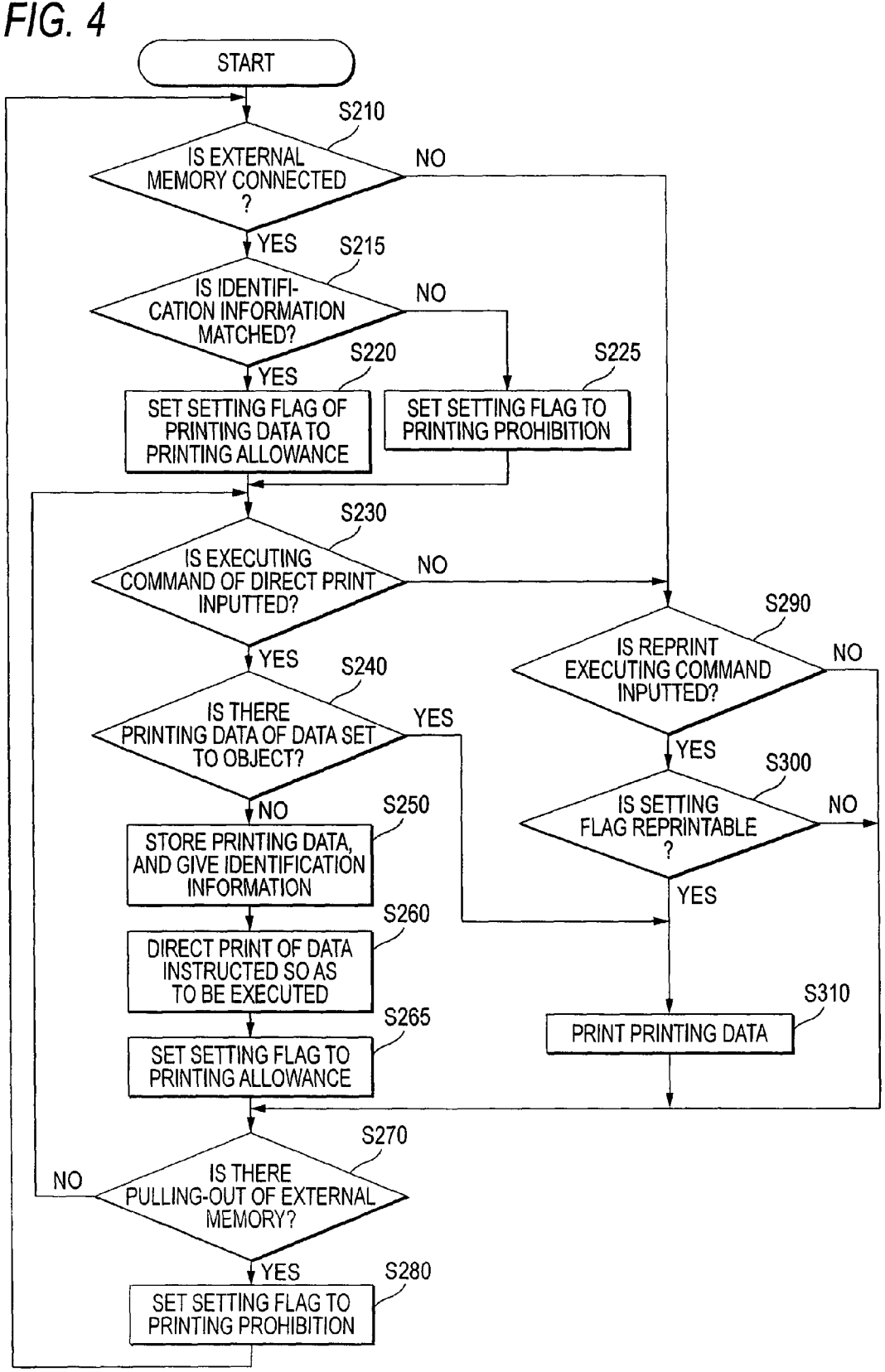
FIG. 4 is a flow chart showing a processing procedure of printing selection processing according to a first example of the present invention.

FIG. 4 is a flow chart showing a processing procedure of the printing selection processing according to a first example.

The printing selection processing is executed when the image forming apparatus 1 is started. When the printing selection processing is started, as shown in FIG. 4, a detecting result of a connection detecting portion 93 is first acquired in S210, and a connecting state as to whether the external memory 106 is connected or not is judged. When it is judged that the external memory 106 is connected, the process goes to S215.

In S215, an identification information for identifying the external memory 106 connected to the connecting portion 105 is acquired from the external memory 106. It is then judged whether or not the acquired identification information and an identification information that is set correspondingly to the printing data (i.e., printing data generated by executing a direct print before this step (S215) is executed) stored on the RAM 102 in S250 described later are matched. Incidentally, the identification information is correspondingly set to the printing data in S250 described later.

When it is judged that these two identification information are matched, the process goes to S220. A setting flag showing whether reprinting of the printing data stored on the RAM 102 is allowed or prohibited is set (i.e., the setting flag is set to 1) so as to allow reprinting (one example of a second allowing unit of the present invention). In contrast, when it is judged that no identification information is matched, the process goes to S225. The setting flag of the printing data stored on the RAM 102 is set so as to prohibit reprinting (i.e., the setting flag is set to 0).

Concretely, in the printing selection processing of this example, a serial number provided in the external memory 106 in advance is used as the identification information.

When S220 and S225 are terminated, the process goes to S230.

In S230, it is judged whether or not an executing command of the direct print is inputted. That is, it is judged whether or not the start key 14*b* is pushed down to print an image based on the data stored on the external memory 106.

Printing information such as a printing sheet number, a printing form (whether it is color printing or monochromatic printing, and allocation printing is performed) and a selection of the data, etc. required to print the image is inputted through a setting screen displayed in the display unit 15.

When it is judged that an executing command is inputted in S230, the process goes to S240.

In S240, it is judged whether or not printing data provided by converting the data that is instructed so as to be printed in S230 is stored on the RAM 102. When the printing data corresponding to the data instructed so as to be printed is judged to be not stored on the RAM 102, the process goes to S250.

In S250, the data instructed so as to be printed in S230 is acquired from the external memory 106, and is converted into printing data and the identification information of the external memory 106 acquired in S215 is given, and the printing data is then stored on the RAM 102 (one example of a memory unit of the present invention). However, a storing area of the RAM 102 storing the printing data (i.e., generated by the direct print) converted in S250 can store only one printing data. When the printing data is newly generated, old printing data is updated (i.e., deleted).

In subsequent S260, the image is printed in accordance with printing information inputted through a setting screen on the basis of the printing data converted in S250 (one example of a printing unit of the present invention).

Further, in S265, a setting flag of the printing data stored on the RAM 102 is set so as to allow reprinting. Concretely, in this example, when reprinting is allowed, the setting flag is set to 1. When reprinting is prohibited, the setting flag is set to 0.

In subsequent S270, a detecting result of the connection detecting portion 93 is acquired and a connecting state as to whether or not the external memory 106 is connected to the connecting portion 105 is judged. When it is judged that the external memory 106 is connected, the process returns to S230.

In contrast, when it is judged that no external memory 106 is connected in S270, the process goes to S280.

In S280, the setting flag of the printing data generated in S250 and stored on the RAM 102, or the setting flag of the printing data set so as to allow reprinting in S220 is set so as to prohibit reprinting (one example of a reprinting disabling unit of the present invention). That is, when the process goes to S280, the reprinting of the printing data stored on the RAM 102 is prohibited (i.e., the setting flag is set to 0).

In contrast, when it is judged that no external memory 106 is connected to the connecting portion 105 in S210, or when it is judged that no executing command of the direct print is inputted in S230, the process goes to S290. That is, when the execution of the direct print is impossible, or when no direct print is executed, the process goes to S290.

In S290, it is judged whether or not a reprint executing command for executing the reprinting of the printing data stored on the RAM 102 is inputted. Concretely, in this example, when the printing information is inputted through the operation unit 14, and the reprint key 14*c* is pushed down in order to print the printing data stored on the RAM 102, it is judged that the reprint executing command is inputted.

Printing information of a printing sheet number, a printing form (whether it is color printing or monochromatic printing and allocation printing is performed), etc. is inputted through the setting screen displayed in the display unit 15. When no printing information is inputted, the printing information at a direct print time executed at a converting time into the printing data is used.

When it is judged that the reprint executing command is inputted in S290, the process goes to S300.

In S300, it is judged whether reprinting of an image based on the printing data printed by the reprint executing command is allowed or prohibited. Concretely, in this example, if the setting flag of the printing data is 1, it is judged that reprinting is allowed. In contrast, if the setting flag is 0, it is judged that reprinting is prohibited.

When it is judged that the reprinting of the printing data is allowed in S300, or when it is judged that the printing data corresponding to the data inputting the executing command of the direct print in S240 is stored on the RAM 102, the process goes to S310. Thus, if the printing data stored on the RAM 102 is reprinted, a processing time is shortened in comparison with a case in which the data stored on the external memory 106 is converted into the printing data and is then reprinted.

In this S310, the image based on the printing data stored on the RAM 102 is reprinted in accordance with the printing information (printing information inputted in S230 when the process goes to S310 from S240) inputted in S290 (one example of a reprinting unit of the present invention).

When it is judged that no reprint executing command is inputted in S290, or when it is judged that the reprinting of the printing data printed by the reprint executing command is prohibited in S300, the actual situation is maintained and the process goes to S270. That is, when no reprinting is executed, or when reprinting is prohibited, the process goes to S270 without executing reprinting.

In the printing selection processing of this example, at an executing time of the direct print, an identification information of the external memory 106 storing the data of a conversion source is given to the printing data converted from the data. Further, the setting flag is set so as to allow the reprinting of these printing data, and the printing data is then stored on the RAM 102. When the external memory 106 is then detached, the setting flag of the printing data stored on the RAM 102 is changed so as to prohibit reprinting.

Further, in the printing selection processing of the first example, when the external memory 106 is reconnected, the identification information is acquired from the external memory 106. When this acquired identification information and the identification information given to the printing data are matched, the setting flag of the printing data stored on the RAM 102 is again changed so as to allow reprinting. In the printing selection processing of the first example, if the setting flag of the printing data stored on the RAM 102 shows the allowance of reprinting when the reprint executing command is inputted, the reprinting of an image based on the printing data is executed. In contrast, if the setting flag shows the prohibition of reprinting, the actual situation is maintained without performing reprinting.

However, in the printing selection processing, when a selecting command for realizing a copy function, or a scanner function, etc. is inputted in the image forming apparatus 1 through the operation unit 14, processing corresponding to this selecting command is preferentially executed. Additionally, reprinting of the printing data may be prohibited. Therefore, even when the printing data remains in the RAM 102, the security of the printing data can be maintained.

As explained above, in accordance with the image forming apparatus 1 of the first example, reprinting of the image based on the printing data generated by executing the direct print is allowed while the external memory 106 is mounted. Therefore, usability at a reprinting time of this image can be maintained at the same level as the related image forming apparatus. Further, while the external memory 106 is mounted, the possibility that a user executing the direct print exists near the image forming apparatus 1 is high. Therefore, it is possible to restrain the possibility that reprinting is performed by a third person except for the user. Accordingly, security of the printing data can be maintained.

In the image forming apparatus 1, when the external memory 106 is detached, the reprinting of the image based on the printing data is prohibited. Therefore, it is possible to prevent a person except for the user executing the direct print from reprinting this image. Accordingly, it is possible to prevent leaking the printing data and maintain the security of the printing data. That is, when the external memory 106 is detached, the possibility that the user terminates the use of the image forming apparatus 1 and separates from the image forming apparatus 1 is high. Therefore, the leakage of the printing data can be prevented by prohibiting reprinting and security can be maintained.

Accordingly, in accordance with the image forming apparatus 1, it is possible to balance the usability at the reprinting time and the security of the printing data.

Further, in the image forming apparatus 1 of the first example, when the identification information acquired from the reconnected external memory 106 and the identification information given to the printing data are not matched, the prohibition of reprinting of the image based on the printing data is maintained. Therefore, the security of the printing data can be precisely maintained. Further, when the identification information acquired from the reconnected external memory 106 and the identification information given to the printing data are matched, the reprinting of the image based on the printing data is allowed. Therefore, time and labor at a printing time of the same data can be omitted.

That is, in accordance with the image forming apparatus 1, it is possible to improve both the security of the printing data and the usability at the printing time of the same data.

Further, in the image forming apparatus 1, when the printing data provided by converting the data set to an object of the direct print is stored on the RAM 102 at an inputting time of an executing command of the direct print, the image based on the printing data is printed. Accordingly, processing for performing conversion from the data to the printing data is omitted. Therefore, usability can be further improved.

Further, in accordance with the image forming apparatus 1, the printing data stored on the RAM 102 is sequentially updated every time new printing data is generated by executing the direct print. Therefore, it is possible to prevent leaking the old printing data and maintain the security of the old printing data.

SECOND EXAMPLE

Figure 5:
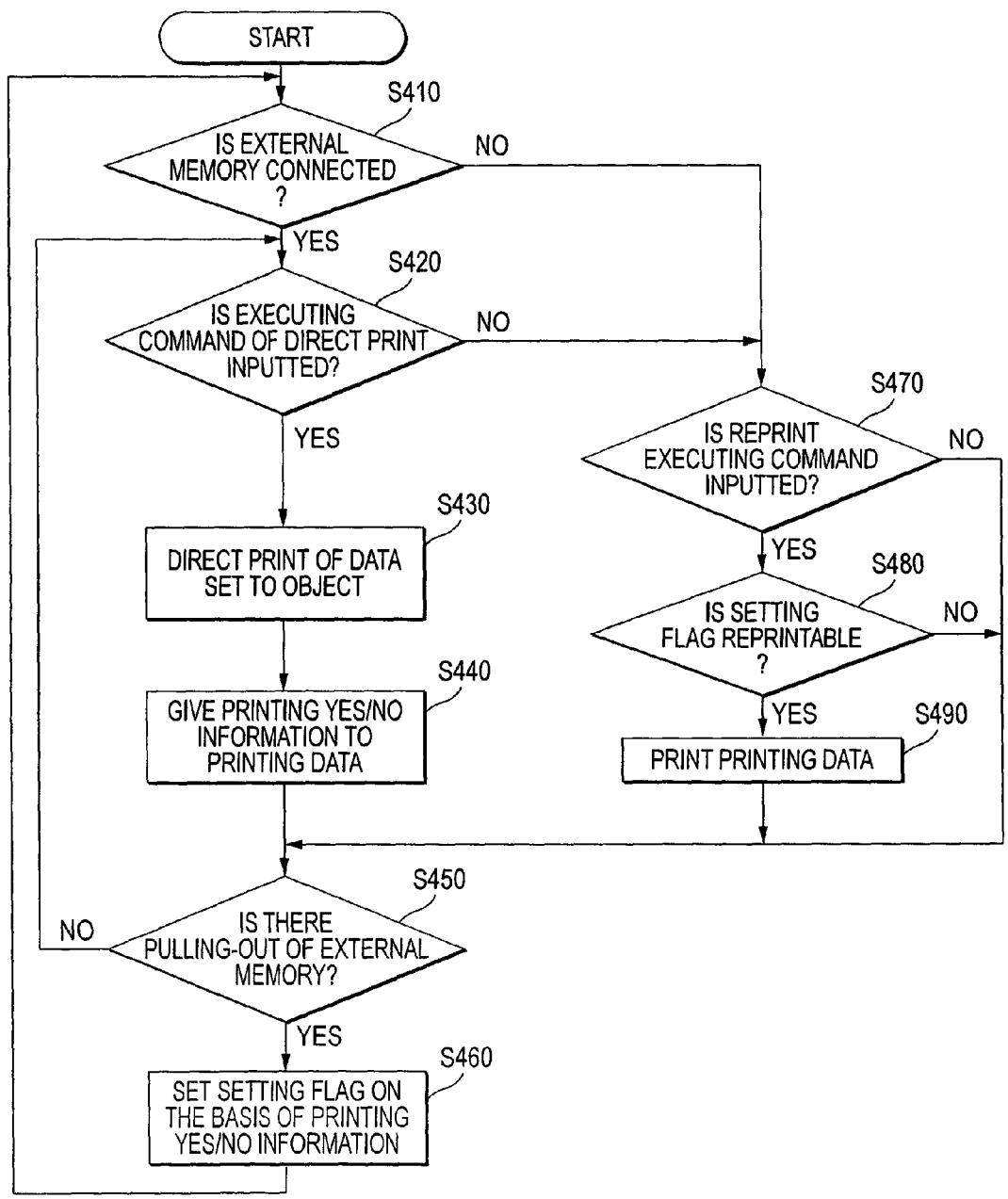
FIG. 5 is a flow chart showing a processing procedure of printing selection processing according to a second example of the present invention.

FIG. 5 is a flow chart showing a processing procedure of the printing selection processing according to a second example.

The printing selection processing in the second example is executed at a starting time of the image forming apparatus 1. When the printing selection processing is started, as shown in FIG. 5, a detecting result of the connection detecting portion 93 is first acquired in S410. A connecting state as to whether the external memory 106 is connected to the connecting portion 105 is judged. When it is judged that the external memory 106 is connected, the process goes to S420.

In this S420, it is judged whether or not an executing command of the direct print is inputted.

When it is judged that the executing command is inputted, the process goes to S430.

In S430, the data selected in S420 is acquired from the external memory 106. The acquired data is converted into printing data and is stored on the RAM 102. Then, the stored data is printed in accordance with printing information inputted through a setting screen.

In subsequent S440, printing yes/no information as information for judging whether reprinting is allowed or prohibited is given to the printing data stored on the RAM 102 in S430. Concretely, in this example, a selecting button for selecting whether reprinting is allowed or not is displayed in the display unit 15. Information selected by the selecting button is given to the printing data as the printing yes/no information.

In S450, the detecting result of the connection detecting portion 93 is acquired and the connecting state as to whether or not the external memory 106 is connected to the connecting portion 105 is judged. When it is judged that the external memory 106 is connected, the process returns to S420.

When it is judged that no external memory 106 is connected in S450, the process goes to S460.

In this S460, a setting flag showing whether reprinting is allowed or prohibited is set in accordance with the printing yes/no information given to the printing data in S440 (one example of a switching unit of the present invention). Thereafter, the process returns to S410. Concretely, in this example, if the printing yes/no information shows the allowance of reprinting, the setting flag is set to 1. In contrast, if the printing yes/no information shows the prohibition of reprinting, the setting flag is set to 0.

In contrast, when it is judged that no external memory 106 is connected to the connecting portion 105 in S410, or when it is judged that no executing command of the direct print is inputted in S420, the process goes to S470. That is, when the execution of the direct print is impossible, or when no direct print is executed, the process goes to S470.

In S470, it is judged whether or not a reprint executing command for executing reprinting of the printing data stored on the RAM 102 is inputted. That is, when the operation unit 14 is operated and printing information for reprinting the printing data stored on the RAM 102 is inputted and the reprint key 14c is then pushed down, it is judged that the reprint executing command is inputted.

When it is judged that the reprint executing command is inputted in S470, the process goes to S480.

In S480, it is judged whether the reprinting of the printing data printed by the reprint executing command is allowed or prohibited.

When it is judged that it is printing data allowing the reprinting in S480, the process goes to S490. An image based on the printing data stored on the RAM 102 is reprinted in accordance with printing information inputted in S470.

When it is judged that no reprint executing command is inputted in S470, or when it is judged that it is printing data prohibiting reprinting in S480, the actual situation is maintained and the process then goes to S450. That is, when no reprinting is executed, or when reprinting is prohibited, the process goes to S450 without performing reprinting.

In the printing selection processing of the second example, at an executing time of the direct print, the printing yes/no information inputted by a user of the image forming apparatus 1 is given to the printing data converted from the data, and the printing data is stored on the RAM 102. When the external memory 106 is then detached, the setting flag is set in accordance with the printing yes/no information with respect to the printing data stored on the RAM 102.

Further, in the printing selection processing of the second example, if the setting flag of the printing data stored on the RAM 102 shows the allowance of reprinting at an inputting time of the reprint executing command, the image based on the printing data is reprinted. In contrast, if the setting flag shows the prohibition of reprinting, the actual situation is maintained without performing reprinting.

However, in the printing selection processing, when a selecting command for realizing a copy function or a scanner function, etc. in the image forming apparatus 1 is inputted through the operation unit 14, processing corresponding to this selecting command is preferentially executed. Additionally, reprinting of the printing data may be prohibited. Therefore, even when the printing data remains in the RAM 102, the security of the printing data can be maintained.

As explained above, in the image forming apparatus of the second example, the setting flag is set at a detaching time of the external memory 106 and shows whether reprinting of the image based on the printing data is allowed or prohibited. This setting flag is set in accordance with the printing yes/no information inputted at an executing time of the direct print.

Therefore, in accordance with the image forming apparatus of the second example, only the data necessary for a user to maintain security can be reliably prohibited in reprinting. Accordingly, it is possible to provide an image forming apparatus conveniently used by the user.

THIRD EXAMPLE

Figure 6:
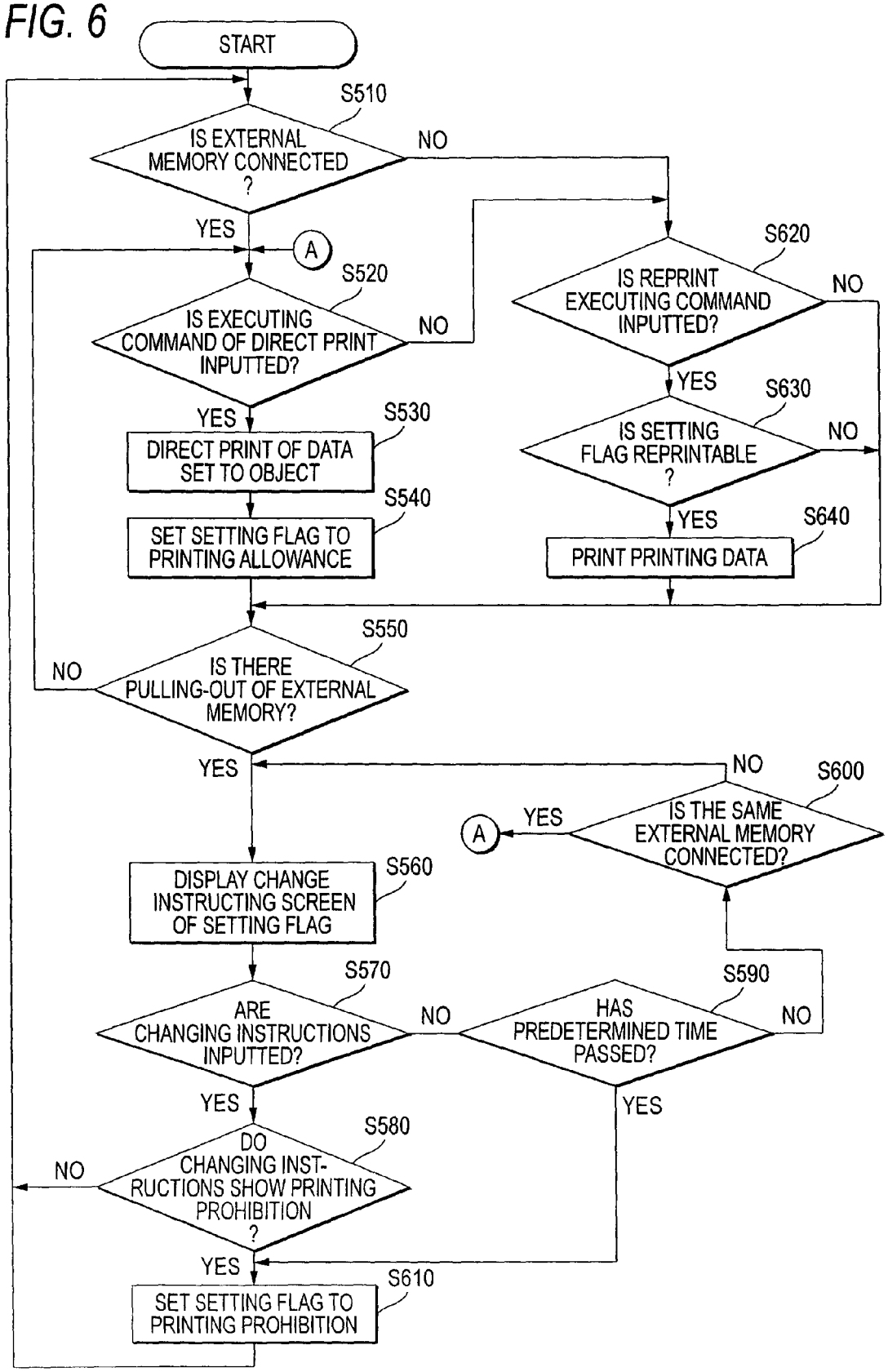
FIG. 6 is a flow chart showing a processing procedure of printing selection processing according to a third example of the present invention.

FIG. 6 is a flow chart showing a processing procedure of the printing selection processing according to a third example.

The printing selection processing in the third example is executed at a starting time of the image forming apparatus 1. When the printing selection processing is started, as shown in FIG. 6, a detecting result of the connection detecting portion 93 is first acquired in S510. A connecting state as to whether or not the external memory 106 is connected to the connecting portion 105 is judged. When it is judged that the external memory 106 is connected, an identification information of the external memory 106 connected to the connecting portion 105 is acquired from the external memory 106 and is stored on the RAM 102, and the process goes to S520.

In S520, it is judged whether or not an executing command of the direct print is inputted.

When it is judged that the executing command is inputted, the process goes to S530.

In S530, data selected in S520 is acquired from the external memory 106. The acquired data is converted into printing data and is stored on the RAM 102. Then, the stored printing data is printed in accordance with printing information inputted through a setting screen.

In subsequent S540, the setting flag showing whether reprinting is allowed or prohibited with respect to the printing data converted in S530 is set to allow reprinting.

In subsequent S550, the detecting result of the connection detecting portion 93 is acquired and a connecting state as to whether or not the external memory 106 is connected to the connecting portion 105 is judged. When it is judged that the external memory 106 is connected, the process returns to S520.

In contrast, when it is judged that no external memory 106 is connected in S550, the process goes to S560.

In this S560, a change instructing screen for inputting a change of the setting flag is displayed in the display unit 15. That is, the allowance or prohibition of reprinting of an image based on the printing data is set on the basis of information inputted through the change instructing screen. Concretely, in the third example, a selecting screen having a selecting button for selecting one of the contents of "allow reprinting" and "prohibit reprinting" of the printing data stored on the RAM 102 is displayed as the change instructing screen.

In subsequent S570, the operation unit 14 is operated and it is judged whether or not instructions of the setting flag are inputted. That is, it is judged whether or not the selecting button is pushed down on the change instructing screen. When it is judged that the instructions of the setting flag are inputted, the process goes to S580.

In S580, it is judged whether the selection of the setting flag inputted in S560 shows the allowance or prohibition of reprinting of the printing data. When it is judged that the selection of the setting flag shows the allowance of reprinting of the printing data, the setting flag of the printing data stored on the RAM 102 is set to allow the reprinting (i.e., the setting flag is set to 1), and the process returns to S510.

Further, when it is judged that no instructions of the setting flag are inputted in S570, the process goes to S590.

In S590, it is judged whether or not a predetermined data holding time (set to 10 seconds in this example) has passed after it is detected that no external memory 106 is connected to the connecting portion 105 in S550. When it is judged that no data holding time has passed after the external memory 106 is detached, the process goes to S600.

In S600, the detecting result of the connection detecting portion 93 is acquired and a connecting state as to whether or not the external memory 106 is connected to the connecting portion 105 is judged. If the external memory 106 is connected, an identification information is acquired from this connected external memory 106. It is then judged whether or not the acquired identification information is matched to an identification information stored on the RAM 102. When it is judged that these two identification information are matched, reprinting of the printing data stored on the RAM 102 is allowed (i.e., the setting flag is set to 1), and the process returns to S520 (one example of a first allowing unit of the present invention). In contrast, when it is judged that the two identification information is not matched, the process returns to S560.

That is, if the external memory 106 connected to the connecting portion 105 is the same as the external memory 106 connected to the connecting portion 105 at the previous time, it is judged that a user at an executing time of the direct print, etc. in S530 uses the image forming apparatus 1.

Further, when it is judged that the data holding time has passed after the external memory 106 is detached in S590, or when it is judged that the selection of the setting flag shows the prohibition of reprinting of the printing data in S580, the process goes to S610.

In S610, the setting flag of the printing data stored on the RAM 102 is set so as to prohibit the reprinting (i.e., the setting flag is set to 0), and the process returns to S510. However, when the process goes to S510 via S600, the process automatically goes to S520.

In contrast, when it is judged that no external memory 106 is connected to the connecting portion 105 in S510, or when it is judged that no executing command of the direct print is inputted in S520, the process goes to S620. That is, when the execution of the direct print is impossible, or when no direct print is executed, the process goes to S620.

In S620, it is judged whether or not the executing command for executing the reprinting of the printing data stored on the RAM 102 is inputted. That is, when the operation unit 14 is operated and printing information for reprinting the printing data stored on the RAM 102 is inputted, and the reprint key 14c is then pushed down, it is judged that the reprint executing command is inputted.

When it is judged that the reprint executing command is inputted in S620, the process goes to S630.

In S630, it is judged whether the reprinting of the printing data reprinted by the reprint executing command is allowed or prohibited.

When it is judged that it is printing data allowing the reprinting, the process goes to S640. An image based on the printing data stored on the RAM 102 is reprinted in accordance with the printing information inputted in S620.

When it is judged that no reprint executing command is inputted in S620, or when it is judged that it is printing data prohibiting reprinting in S630, the actual situation is maintained and the process goes to S550. That is, when no reprinting is executed, or when reprinting is prohibited, the process goes to S550 without performing reprinting.

In the printing selection processing of the third example, at an executing time of the direct print, a user of the image forming apparatus 1 sets the setting flag with respect to the printing data converted from the data and stored on the RAM 102 when the external memory 106 is detached. However, when no instructions of the setting flag are inputted within the data holding time after the external memory 106 is detached, the reprinting of the printing data is automatically prohibited.

Further, in the printing selection processing of the third example, when the same external memory 106 as the external memory 106 connected at the previous time is connected within the data holding time after the external memory 106 is detached, the reprinting of the printing data is allowed and it waits for an executing command of the direct print.

In the printing selection processing of the third example, if the setting flag of the printing data stored on the RAM 102 shows the allowance of reprinting at an inputting time of the reprint executing command, the reprinting of an image based on the printing data is executed. In contrast, if the setting flag shows the prohibition of reprinting, the actual situation is maintained without performing reprinting.

However, in the printing selection processing, when a selecting command for realizing a copy function or a scanner function, etc. in the image forming apparatus 1 is inputted through the operation unit 14, processing corresponding to this selecting command is preferentially executed. Additionally, reprinting of the printing data may be prohibited. Therefore, even when the printing data remains in the RAM 102, the security of the printing data can be maintained.

As explained above, in the image forming apparatus of the third example, the setting flag showing whether the reprinting of the image based on the printing data is allowed or prohibited is set in accordance with a command from a user inputted after the external memory 106 is detached.

Therefore, in accordance with the image forming apparatus of the third example, only the data necessary for the user to maintain security can be reliably prohibited in reprinting. As this result, it is possible to provide an image forming apparatus conveniently used by the user.

Further, in accordance with the image forming apparatus of the third example, when no instructions of the setting flag are inputted within the data holding time after the external memory 106 is detached, the reprinting of the image based on the printing data is automatically prohibited. Therefore, the security of the printing data can be reliably maintained.

Further, in accordance with the image forming apparatus of the third example, when the same external memory 106 as the external memory 106 connected at the previous time is connected within the data holding time after the external memory 106 is detached, the reprinting of the image based on the printing data is allowed. Therefore, waste of time and labor at a printing time of the same image can be prevented.

That is, in accordance with the image forming apparatus of the third example, it is possible to further improve both usability at a reprinting time of the same data and security of the printing data.

OTHER EXAMPLES

The examples of the present invention have been explained above. However, the present invention is not limited to the above examples, but can be executed in various modes in a scope not departing from the gist of the present invention.

In the printing selection processing of the first example, comparison of the identification information of the external memory 106 and the identification information given to the printing data is executed when the external memory 106 is remounted to the connecting portion 105, but the present invention is not limited to this case. For example, this comparison may be also executed when the external memory 106 is remounted and the executing command of the direct print is inputted. That is, when the identification information of the external memory 106 and the identification information given to the printing data are matched, the setting flag may be set so as to allow printing of the image based on the printing data.

In the printing processing of the first example, one or both of S215 to 225 (in this case, one set is formed by S215, 220 and 225), and S240 during the processing may be also omitted.

In the printing selection processing of the second example, the setting flag is set in accordance with the printing yes/no information inputted by a user, but the present invention is not limited to this case.

For example, when specific information (e.g., information included within a water mark and a header) showing a security level prescribed in advance or more is added to the data and it is data of an extension identifier designated in advance, printing yes/no information for prohibiting the reprinting of the image based on the printing data may be also automatically given to the printing data. Further, when the external memory 106 is set to writing prohibition, printing yes/no information for prohibiting the reprinting of the image based on the printing data may be also automatically given to the printing data.

Accordingly, the security of the printing data can be maintained even in the image forming apparatus for automatically giving the printing yes/no information to the printing data.

Further, in the printing selection processing of the third example, the data holding time is set to 10 seconds. However, the data holding time is not limited to 10 seconds.

In the image forming apparatuses of the first example, the second example and the third example, conversion is immediately performed from the data to printing data able to be printed, and the printing data is stored on the RAM 102. However, the data before the conversion may be also stored on the RAM 102. Further, the data may be also stored on the RAM 102 in combination with the printing data (i.e., as a pair).

Further, in the printing selection processing in the first example, the second example and the third example, the setting flag is set so as to prohibit the reprinting of the image based on the printing data. However, the printing data may be also erased instead of setting the setting flag.

In this case, when the external memory 106 is detached, the printing data is erased. Therefore, the security of the printing data can be reliably protected. Further, when the external memory 106 is mounted, the image based on the printing data can be reprinted. Therefore, usability at a reprinting time of the same data can be maintained.

In the image forming apparatuses of the first example, the second example and the third example, conversion is immediately performed from the data to printing data able to be printed, and the printing data is stored on the RAM 102. However, the data acquired from the external memory 106 may be stored on an inner memory (not shown) such as HDD of the image forming apparatus 1 before the conversion. When executing printing, the data stored on the inner memory may be converted to printing data able to be printed and stored on the RAM 102. In the printing selection processing, the setting flag may be set so as to prohibit the reprinting of the image based on the printing data. The printing data may be also erased instead of the setting of the setting flag. Further, the data stored on the inner memory may also be erased when erasing the printing data.

Further, in the image forming apparatuses of the first example, the second example and the third example, the number of printing data stored on the RAM 102 is set to one, but the number stored on the RAM 102 may be also plural. In this case, when new printing data is generated, data may be updated and stored from oldest printing data.

Further, in the printing selection processing in the first example, the second example and the third example, the printing data is stored on the RAM 102 at an executing time of the direct print and the setting flag is set with respect to these printing data. However, the present invention is not limited to this case.

For example, when the data read from a document, etc. in the image reading section 40 is directly stored on the external memory 106, the data may be also stored on the RAM 102 and the setting flag may be also set with respect to the data. That is, the data acquired at an executing time of a so-called scan-to memory may be also treated similarly to the printing data in the printing selection processings in the first example, the second example and the third example.

The image forming apparatuses in the first example, the second example and the third example may not be set to a multi-function device, and may be also a printer and a copying machine. That is, it is sufficient if it is an image forming apparatus able to execute the direct print.

The external memory 106 may be any memory if this memory can store the data. For example, it is possible to use a recording medium connectable by a general hard disk drive and USB, smart media® and compact flash®, etc. Further, in the above aspects, description has been given of a case where the RAM 102 is used as an example of the memory unit. However, the memory unit may be a HDD, etc.

Further, according to another aspect of the present invention, the memory unit stores printing data that is converted from the data acquired from the external memory device so as to be printed by the printing unit.

That is, the data acquired from the external memory device or the exterior is converted into data able to be printed by the printing unit and is then printed. Therefore, these printing data may be also stored.

Thus, it is possible to further improve the usability when the printing user reprints the same data.

According to still another aspect of the present invention, the controller is operable to prohibit the data from being reprinted by prohibiting the printing unit from reprinting the data.

According to still another aspect of the present invention, the controller is further operable to allow the reprint of the data prohibited from being reprinted when the detection result indicates mounting of the external memory device within a predetermined time after the detection result changes from mounting to non-mounting of the external memory device.

According thereto, even when the external memory device is once set to non-mounting, reprinting processing can be executed if the external memory device is again mounted within a predetermined time (i.e., time prescribed in advance) after the non-mounting is set. Accordingly, time required in reprinting of the same data can be shortened. Thus, the usability can be further improved while the security of the data is maintained.

According to still another aspect of the present invention, the controller is further operable to allow the reprint of the data prohibited from being reprinted when an identification information acquired from the external memory device mounted to the mounting portion and an identification information given to the data are matched after the detection result changes from mounting to non-mounting of the external memory device.

According thereto, the execution of the prohibited reprinting processing is allowed only when the identification information acquired from the external memory device again mounted to the mounting portion, and the identification information given to the data is matched. Therefore, the security of the data can be maintained. Further, if these identification information is matched, the reprinting processing can be executed even when the external memory device once set to non-mounting is again mounted. Therefore, time required in reprinting of the same data can be shortened. Thus, both maintaining security of the data and the usability at a reprinting time can be further improved.

According to still another aspect of the invention, the image forming apparatus further comprises a switching unit that switches between validating or invalidating the prohibition of the data from being reprinted.

According thereto, the switching unit sets the reprinting disabling unit to be valid when the data converted into the printing data is a predetermined kind of data.

According to still another aspect of the present invention, the switching unit validates the prohibition of the data from being reprinted when printing data converted from the data so as to be printed by the printing unit is a predetermined kind of data.

According to still another aspect of the present invention, the predetermined kind of data includes data in which an index showing at least a predetermined threshold value in security level is included. Further, according to still another aspect of the invention, the predetermined kind of data includes data which has a predetermined format. For example, the data having a structure in which an index showing a predetermined threshold value or more in security level is included within the data (more concretely, a structure including specific information in a header of data, a structure including a water mark in a printing image, etc.), or a structure in which the data is a predetermined extension identifier, etc.

According to still another aspect of the present invention, the switching unit validates the prohibition of the data from being reprinted when the switching unit acquires a limit information indicating write protection for the external memory device from the external memory device.

When the external memory device is normally set to writing prohibition, the possibility that the data requiring security is high in this external memory device. Therefore, if the external memory device mounted to the mounting portion is set to writing prohibition, the execution of reprinting processing may be also prohibited. Thus, the security of the data can be more appropriately protected.

According to still another aspect of the present invention, the switching unit switches between validating or invalidating the prohibition of the data from being reprinted in accordance with an external command received from outside of the image forming apparatus.

According thereto, validity and invalidity of the reprinting disabling unit are set in accordance with the external command. Therefore, the security of the data desired by a user can be appropriately maintained.

According to still another aspect of the present invention, the switching unit receives the external command while the printing unit executes printing of the data.

According thereto, while the data is printed, the reprinting disabling unit can be set to validity or invalidity. Therefore, the execution of reprinting processing can be prohibited with respect to only the data necessary for the user to maintain the security. As this result, the usability can be further improved.

According to still another aspect of the present invention, the switching unit receives the external command within a predetermined time after the detection result changes from mounting to non-mounting of the external memory device.

According thereto, the reprinting disabling unit can be set to validity or invalidity if it is within the predetermined time after the external memory device is set to non-mounting. Therefore, the execution of reprinting processing can be prohibited with respect to only the data necessary for a user to maintain security. As this result, the usability can be further improved.

According to still another aspect of the present invention, the switching unit validates the prohibition of the data from being reprinted when no external command is received within a predetermined time.

According thereto, if there is no external command within the predetermined time, the execution of reprinting processing is prohibited. Therefore, the security of the data can be maintained in high probability.

According to still another aspect of the present invention, the controller is operable to prohibit the data from being reprinted by erasing the data stored on the memory unit.

According thereto, it is possible to reliably prevent that the data is printed by another user. Therefore, the security of the data can be reliably maintained.

What is claimed is:

1. An image forming apparatus comprising:
a mounting portion on which an external memory device is mountable;
a detecting unit configured to detect mounting and non-mounting of the external memory device to the mounting portion;
a printing unit configured to print data acquired from the external memory device;
a memory unit configured to store the data; and
a controller configured to control the printing unit to reprint the data stored on the memory unit, and prohibit the data from being reprinted when a detection result by the detecting unit indicates non-mounting of the external memory device,
wherein the controller is configured to prohibit the data from being reprinted by setting a permission flag of the data to a prohibited state so as to prohibit the printing unit from reprinting the data, and to later allow the reprinting of the data prohibited from being reprinted by setting the permission flag of the data to an allowed state when a detection result by the detection unit indicates mounting of the external memory device so as to allow the printing unit to reprint the data.

2. The image forming apparatus according to claim 1, wherein the memory unit is configured to store printing data that is converted from the data acquired from the external memory device so as to be printed by the printing unit.

3. The image forming apparatus according to claim 1, wherein the controller is further configured to allow the reprint of the data prohibited from being reprinted by setting the permission flag of the data to the allowed state when the detection result indicates mounting of the external memory device within a predetermined time after the detection result changes from mounting to non-mounting of the external memory device.

4. The image forming apparatus according to claim 1, wherein the controller is further configured to allow the reprint of the data prohibited from being reprinted by setting the permission flag of the data to the allowed state when an identification information acquired from the external memory device mounted to the mounting portion and an identification information given to the data are matched after the detection result changes from mounting to non-mounting of the external memory device.

5. The image forming apparatus according to claim 1, wherein the image forming apparatus further comprises a switching unit configured to switch between validating or invalidating the prohibition of the data from being reprinted.

6. The image forming apparatus according to claim 5, wherein the switching unit is configured to validate the prohibition of the data from being reprinted when printing data converted from the data so as to be printed by the printing unit is a predetermined kind of data.

7. The image forming apparatus according to claim 6, wherein the predetermined kind of data includes data in which an index showing at least a predetermined threshold value in security level is included.

8. The image forming apparatus according to claim 6, wherein the predetermined kind of data includes data which has a predetermined format.

9. The image forming apparatus according to claim 5, wherein the switching unit is configured to validate the prohibition of the data from being reprinted when the switching unit acquires a limit information indicating write protection for the external memory device from the external memory device.

10. The image forming apparatus according to claim 5, wherein the switching unit is configured to switch between validating or invalidating the prohibition of the data from being reprinted in accordance with an external command received from outside of the image forming apparatus.

11. The image forming apparatus according to claim 10, wherein the switching unit is configured to receive the external command while the printing unit executes printing of the data.

12. The image forming apparatus according to claim 10, wherein the switching unit is configured to receive the external command within a predetermined time after the detection result changes from mounting to non-mounting of the external memory device.

13. The image forming apparatus according to claim 12, wherein the switching unit is configured to validate the prohibition of the data from being reprinted when no external command is received within a predetermined time.

* * * * *